United States Patent [19]

Lindgren

[11] Patent Number: 5,710,893
[45] Date of Patent: Jan. 20, 1998

[54] METHOD AND APPARATUS FOR REPLICATING DIGITAL SIGNALS

[75] Inventor: Bert A. Lindgren, Charlotte, N.C.

[73] Assignee: LAN-hopper, Systems, Inc., Atlanta, Ga.

[21] Appl. No.: 517,954

[22] Filed: Aug. 22, 1995

[51] Int. Cl.$^6$ .............................. G06F 3/00; G06F 11/00
[52] U.S. Cl. .................... 395/311; 395/312; 395/183.01; 370/245
[58] Field of Search ...................... 395/311, 312, 395/183.01, 183.19; 370/245

[56] References Cited

U.S. PATENT DOCUMENTS

| | | | |
|---|---|---|---|
| 4,847,837 | 7/1989 | Morales et al. | 395/182.02 |
| 5,528,748 | 6/1996 | Wallace | 395/183.01 |
| 5,572,533 | 11/1996 | Sunada et al. | 370/20.1 |
| 5,630,049 | 5/1997 | Cardoza et al. | 395/183.01 |

Primary Examiner—Jack B. Harvey
Assistant Examiner—Jeffrey K. Seto
Attorney, Agent, or Firm—Needle & Rosenberg, P.C.

[57] ABSTRACT

A method and apparatus for providing a plurality of digital devices, including protocol analyzers, work stations, cable testers, and the like, with a data signal received from one of a plurality of target networks is. A plurality of data ports, including at least one target data port, a plurality of device data ports, and a plurality of intermediate data ports. Data channels establish a plurality of device data paths between a plurality of digital devices and a corresponding plurality of device data ports and a target data path between one of the target networks and at least one of the target data ports. A switch establishes a first data path between any selected one of the plurality of target data ports and a respective first intermediate data port. A replicator replicates a first data signal from the first intermediate data port at least to a second intermediate data port and to a third intermediate data port. A switch establishes a second data path between the second intermediate data port and a first selected data port of the plurality of device data ports and establishes a third data path between the third intermediate data port and a second selected data port of the plurality of device data ports. Thus, data can be selectively exchanged between any one of the plurality of target networks and at least any two of the plurality of digital devices.

25 Claims, 4 Drawing Sheets

Microfiche Appendix Included
(1 Microfiche, 17 Pages)

METHOD AND APPARATUS FOR REPLICATING DIGITAL SIGNALS

REFERENCE TO MATERIAL SUBJECT TO COPYRIGHT PROTECTION

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyrights whatsoever.

1. Field of the Invention

The present invention relates to digital communications and, in particular, to replicating a plurality of channels of digital data.

2. Description of the Prior Art

A local area network (LAN) is a system for linking computers and telecommunications equipment within a limited geographic region. Some LANS can be very complex with many devices communicating simultaneously. Because of the need to maintain communications between the devices on a LAN, analysis of problems developing on a LAN is frequently performed during normal operation of the LAN. To facilitate this, many LANS are provided with a data port (as used herein, data port means a point at which at least two devices may be placed in data communication with each other) to allow the connecting of an analyzer, or other digital device, to the LAN.

The current method of troubleshooting a LAN involves connecting an analyzer, or other digital device, to one of the data ports on the LAN. If only one data port is available on the LAN, only one analyzer can be connected to the LAN. This creates difficulty when more than one problem is being diagnosed on the LAN at a given time. In such a situation, several analyzers, often of differing types, are required to analyze different types of events on the LAN. Because only one data port is available, the different analyzers must be connected to the LAN in turn. Similarly, when several technicians require access to a single LAN, they are unable to work simultaneously when there is only one data port available.

Currently, no apparatus exists that facilitates connecting several digital devices simultaneously to a LAN having a single available data port.

SUMMARY OF THE INVENTION

One aspect of the present invention is an apparatus for providing a plurality of digital devices with a data signal received from one of a plurality of target networks. A plurality of data ports, including at least one target data port, a plurality of device data ports, and a plurality of intermediate data ports, is provided. Data channels establish a plurality of device data paths between a plurality of digital devices and a corresponding plurality of device data ports and establish a target data path between one of the target networks and at least one of the target data ports. A switch establishes a first data path between any selected one of the plurality of target data ports and a respective first intermediate data port. A replicator replicates a first data signal from the first intermediate data port at least to a second intermediate data port and to a third intermediate data port. A switch establishes a second data path between the second intermediate data port and a first selected data port of the plurality of device data ports and establishes a third data path between the third intermediate data port and a second selected data port of the plurality of device data ports. Thus, data can be selectively exchanged between any one of the plurality of target networks and at least any two of the plurality of digital devices.

Another aspect of the present invention is an apparatus for establishing data communication paths between a plurality of target networks and a plurality of digital devices. A cross-bar switch is in data communication with the target networks and the digital devices. A plurality of replicators in data communication with the cross-bar switch generates, and makes available to the cross-bar switch, at least two copies of a data signal received from the cross-bar switch. A controller in control communication (control communication, as used herein, means communicating control signals independent of the data exchange being effected by the cross-bar switch) with the cross-bar switch selectively causes the cross-bar switch to establish a first data path between at least one target network and a first replicator. The controller also selectively causes the cross-bar switch to establish a second data path between the first replicator and at least one digital device.

Another aspect of the present invention is a series of operational steps to be performed on a computer used to control an apparatus employing a plurality of replicators, with each replicator having at least three ports, to provide a plurality of digital devices with a data signal received from at least one of a plurality of target networks. The computer determines that a first digital device of the plurality of digital devices has requested the establishment of a data path between the first digital device and a selected first target network of the plurality of target networks. The computer then establishes a data path between the first digital device and the first target network when the first digital device has requested the establishment of a data path, and when no data path has already been established between the first target network and a second digital device.

Another aspect of the present invention is a method of providing a plurality of digital devices with a data signal received from one of a plurality of target networks. A data path is established between a target network and a target data port. A data path is established between a plurality of digital devices and a plurality of device data ports. A first data path is established between any selected one of a plurality of target data ports and a first intermediate data port. A first data signal from the first intermediate data port is replicated to at least a second intermediate data port and a third intermediate data port. A second data path is established between the second intermediate data port and a first selected device data port of a plurality of device data ports. A third data path is established between the third intermediate data port and a second selected device data port of the plurality of device data ports.

Therefore, an advantage of the present invention is that it allows several digital devices, such as analyzers, to be connected to a single data port of a LAN.

A further advantage of the present invention is that it allows the connection and disconnection of devices to a LAN without having to upset its normal operation.

These and other advantages will become apparent from the following description of the preferred embodiment taken in conjunction with the following drawings, although variations and modifications may be effected without departing from the spirit and scope of the novel concepts of the disclosure.

DETAILED DESCRIPTION OF THE INVENTION

Figure 1:
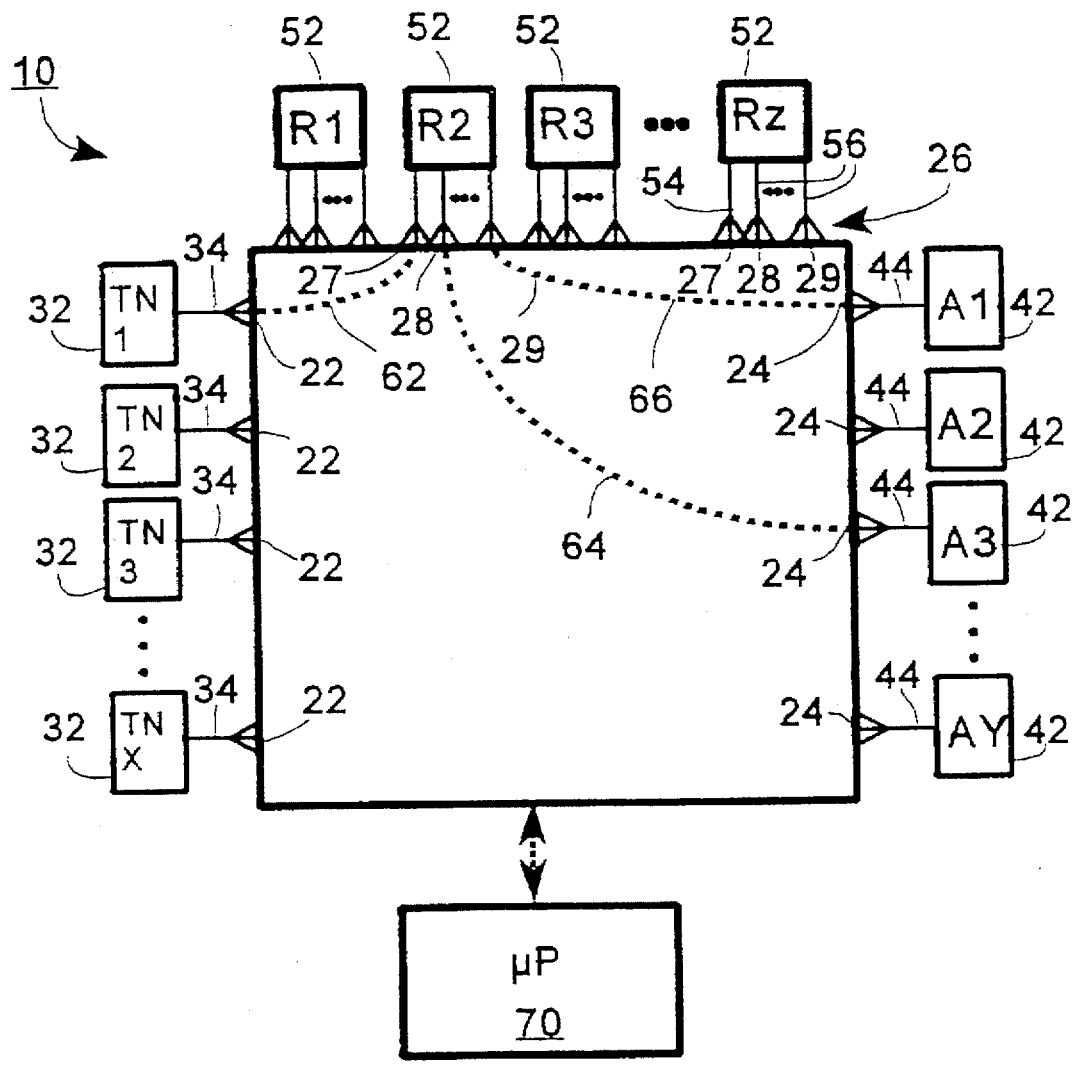
FIG. 1 is a schematic diagram of an apparatus in accordance with the present invention.

A preferred embodiment of the invention is now described in detail. Referring to the drawings, like numbers indicate like parts throughout the views. As used in the description herein and throughout the claims that follow, "a," "an," and "the" includes plural reference unless the context clearly dictates otherwise. Also as used in the description herein and throughout the claims that follow, the meaning of "in" includes "in" and "on" unless the context clearly dictates otherwise.

As shown in FIG. 1, the present invention 10 provides a plurality of digital devices 42, with a data signal received from one of a plurality of target networks 32, such as a LAN, a token-ting or any other conventional data exchanging network. The digital devices 42 may comprise network protocol analyzers, work stations, cable testers, or other devices that communicate with a network. A cross-bar switch 20 (as used herein, cross-bar switches include many-to-many switches, square switches, and any other data routing apparatus capable of making arbitrary data interconnections between a plurality of communicating devices) has a plurality of data ports, or signal connection points, including at least one target data port 22, a plurality of device data ports 24, and a plurality of intermediate data ports 26. The present invention may be implemented on any data transmission network, including those employing optical data transmission and those employing electronic data transmission. An example of a suitable optical cross-bar switch includes the GlassHopper FOSM 7200 from LanHopper, Inc.; examples of suitable electronic cross-bar switches include: UTPHopper TPSM/32-32/4 from LanHopper, Inc. and Switchex switches from NHC, Inc.

A plurality of data channels (which may comprise coaxial cables, fiber optic lines, or any other conventional data transfer medium) establish a plurality of device data paths 44 between the plurality of digital devices 42 and a corresponding plurality of the device data ports 24. Similarly, at least one target data path 34 is established between at least one of the target networks 32 and at least one of the target data ports 22 with conventional data channels. The cross-bar switch 20 is capable of establishing a first data path 62 between any selected one of the plurality of target data ports 22 and a respective first intermediate data port 27.

One of a plurality of replicators 52 (as used herein, a replicator is any device capable of receiving a signal and outputting at least two copies of the signal) receives a first data signal from the first intermediate data port 27 and copies the signal to at least a second intermediate data port 28 and a third intermediate data port 29. (Examples of suitable optical replicators include: Fiorl Module 5304P and FDDI Module 5910, both from Bay Networks, Inc.; examples of suitable electronic signal replicators include Ethernet Module 5308P from Bay Networks, Inc. and Ethernet UltraHub 1010 from Cameo, Inc.) The cross-bar switch 20 then establishes a second data path 64 between the second intermediate data port 28 and a first selected data port of the plurality of device data ports 24 and also establishes a third data path 66 between the third intermediate data port 29 and a second selected data port of the plurality of device data ports 24. Thus, data can be selectively exchanged between any one of the plurality of target networks 32 and at least any two of the plurality of digital devices 42.

A microprocessor 70 (suitable microprocessors include the 80486 from Intel, Inc., although many general microprocessors may be adapted in accordance with the present invention, as would be obvious to one skilled in the data communications an), or other programmed control device (which could include a plurality of discrete logic elements) automatically controls the cross-bar switch 20. The microprocessor 70 comprises a program that causes establishment of the data paths 62, 64, and 66.

Figure 2:
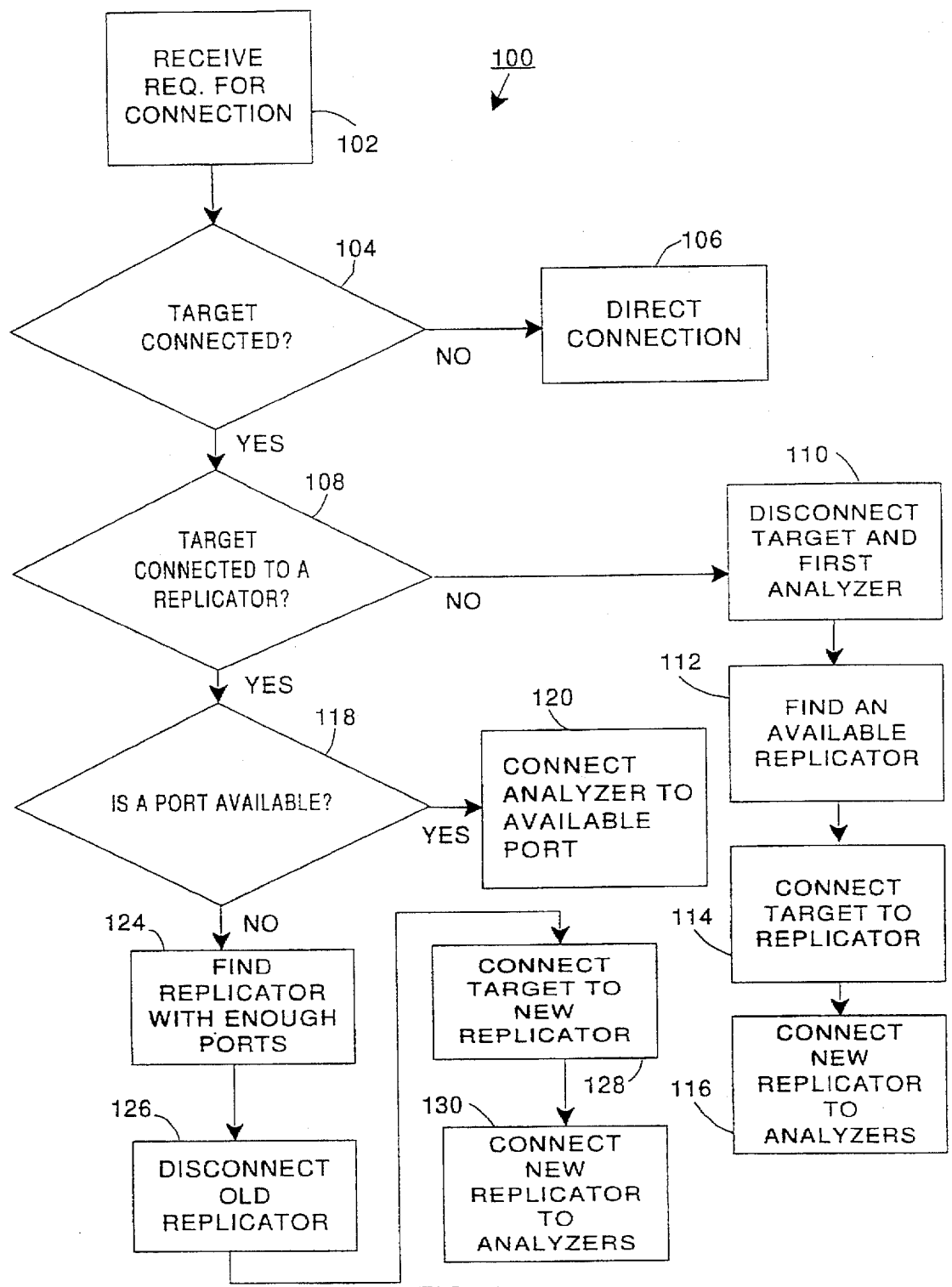
FIG. 2 is a flow chart of a computer program in accordance with the present invention.

As shown in FIG. 2, the program 100 (code for which is disclosed in the appendix) comprises a series of operational steps to be performed on a computer. Initially, an operation 102 determines that a first digital device of the plurality of digital devices has requested the establishment of a data path between the first digital device and a selected first target network of the plurality of target networks. Then a test 104 is performed to determine if a data path has already been established between the first target network and a second digital device. When no such path has been established, an operation 106 establishes a data path between the first digital device and the first target network.

If a data path has already been established between the first target network and a second digital device, a test 108 is performed to determine if a data path has already been established between the first target network and a first replicator. If no data path has already been established between the first target network and a first replicator, then a plurality of operations 109 establish a data path between the first target network and the first and second digital devices. In executing the establishing operations 109, an operation 110 finds a currently available first replicator from the plurality of replicators, then an operation 112 terminates the data path that has already been established between the first target network and the second digital device. Next, an operation 114 establishes a data path between the first replicator and the first target network and an operation 116 establishes a data path between the first replicator and the first digital device and establishes a data path between the first replicator and the second digital device.

If the result of test 108 is that a data path has already been established between the first target network and a first replicator, a test 118 is performed to determine if the first replicator has an available first port. If it does, an operation 120 is performed that establish a data path between the first port and the first digital device. If, on the other hand, the first replicator does not have an available first port, a plurality of operations 122 establishes data paths between the first target network, the first digital device and any digital devices in data communication with the second replicator. In executing the establishing operation 122, an operation 124 finds a currently available third replicator having enough ports to establish data paths between the second replicator and at least the first digital device, the first target network and the digital devices in data communication with the second replicator. Next, an operation 126 terminates the data path between the second replicator and the first target network and terminates the data paths between the second replicator and the digital devices in data communication with the second replicator. An operation 128 then establishes a data path between the first target network and the third replicator and establishes a data path between the third replicator and the first digital device. Finally, an operation 130 establishes a data path between the third replicator and the digital devices previously in data communication with the second replicator.

An additional step (not shown in FIG. 2) may comprise the step of terminating the data path between the first digital device and the first target network when the first digital device no longer needs to receive data from the first target network. This step is optional, as it may be desirable to reconfigure the system only when necessary.

Figure 3:
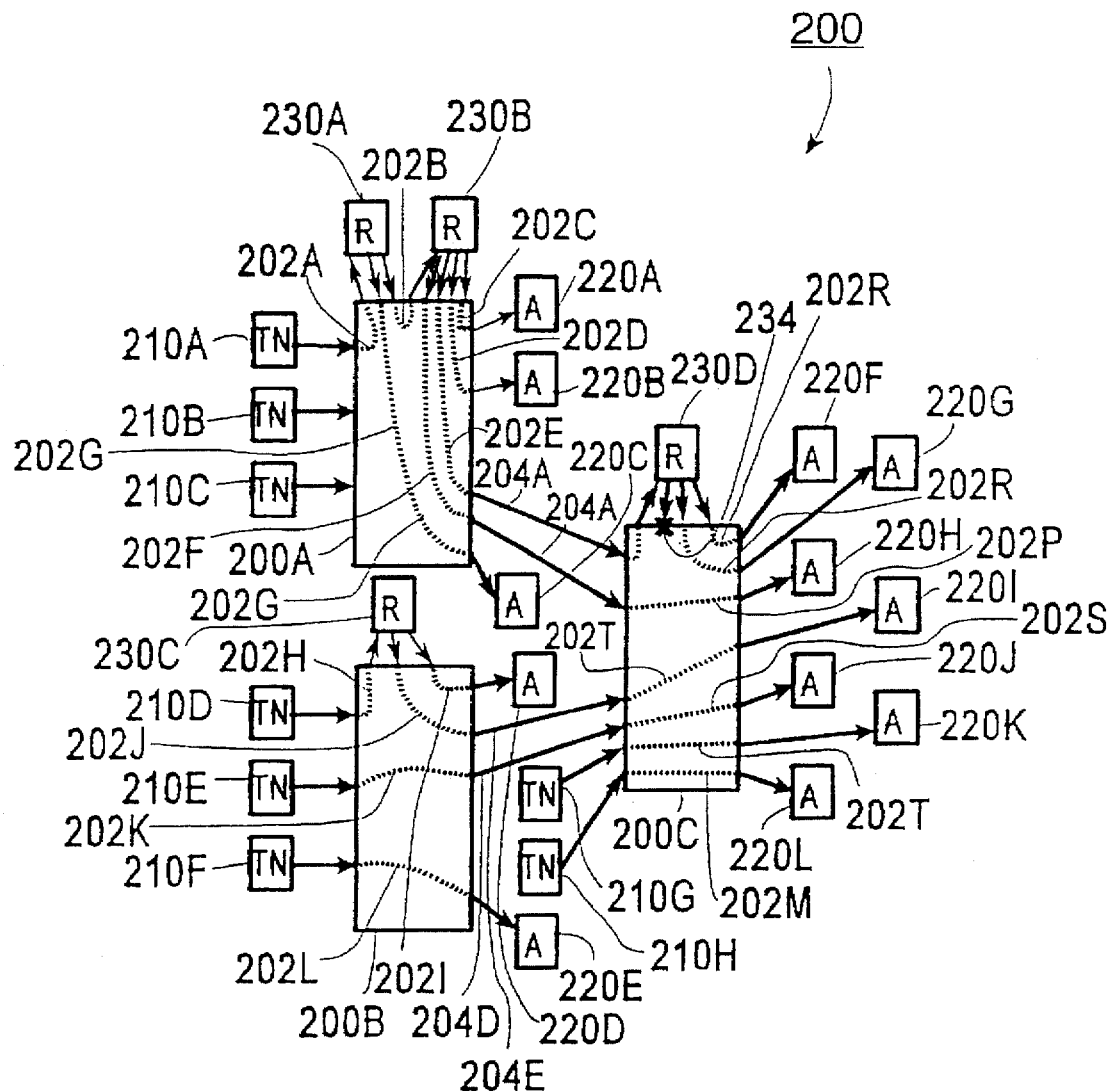
FIG. 3 is a schematic diagram showing various connections possible with the present invention

A shown in FIG. 3, complex connections may be made between target networks 210A–H and digital devices 220A–L, and an embodiment of the present invention 200 may comprise more than one cross-bar switch 202A–C connected to a plurality of replicators 230A–D. (A many-to-many cross-bar switch is shown in this illustrative example. Such a switch, as used herein, is a switch capable of making a connection between at least one of a first set of data ports to any one of a second set of data ports.) Various data paths 202A–T connect the devices in communication with the cross-bar switches 200A–C and external data paths 204A–D connect cross-bar switches 200A, 200B to cross-bar switch 200C. With a complex combination of the type shown, many connections are possible. In one example, a simple direct connection is shown between target network 210F and digital device 220E via data path 202L. In a more complex example, a signal from target network 210A is replicated to digital devices 220A, 220B, 220C, 220F, 220G, and 220H, allowing six different users to monitor target network 210A simultaneously. The signal from target network 210A is first routed to replicator 230A via data path 202A. Replicator 230A replicates the signal onto data paths 202G and 202B. The signal on data path 202G is sent to digital device 220C and the signal on data path 202B is sent to replicator 230B, which copies it to data paths 202C–F. Replicator 230B has four output ports 232B. Copies of the signal on data paths 202C and 202D are transferred to digital devices 220A and 220B, respectively, whereas copies of the signal on data paths 202E and 202F are transferred to data paths 202O and 202P by external data paths 204A and 204B, respectively. The signal on data path 202P is sent to digital device 220H and the signal on data path 202O is sent to replicator 230D. Replicator 230D has three output ports 232D, one of which, output port 234 is idle. The remaining output ports 232D copy the signal onto data paths 202Q and 202R to digital devices 220F and 220G, respectively.

Figure 4:
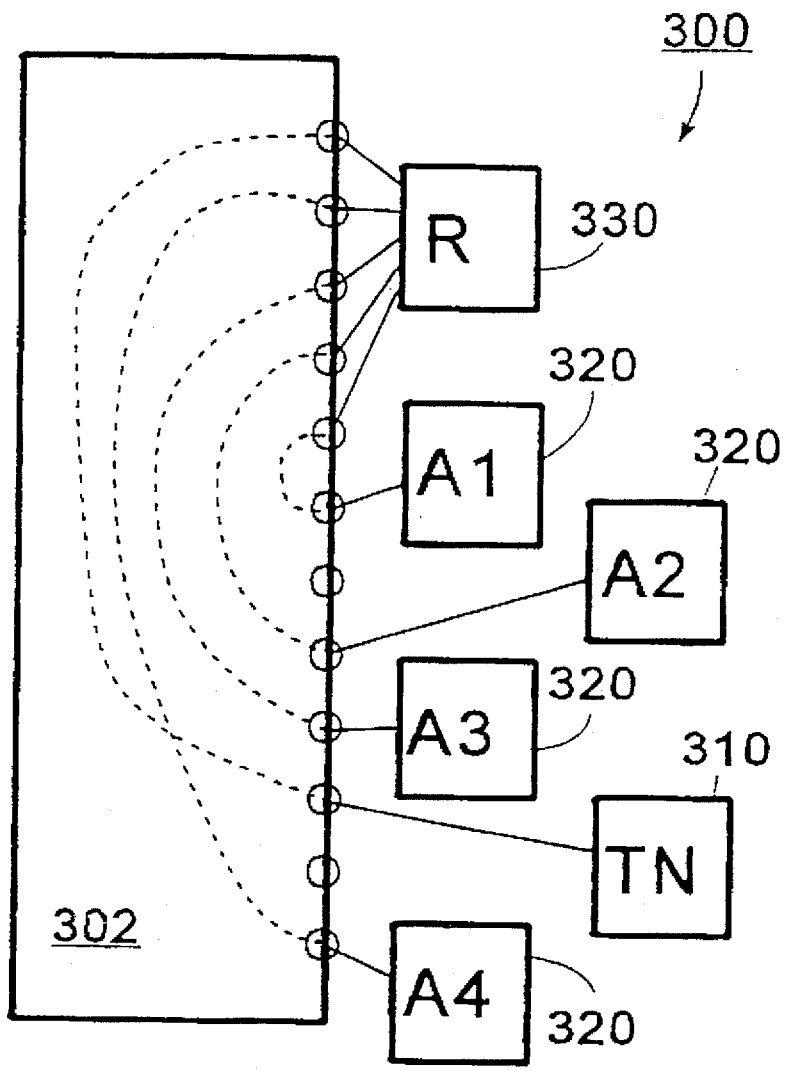
FIG. 4 is a schematic diagram of an alternate embodiment of the present invention.

As shown in FIG. 4, in an alternative embodiment of the present invention, a square switch 302 may be used to interconnect a target network 310 with at least one replicator 330 and a plurality of digital devices 320. A square switch 302 may be more versatile than a many-to-many switch, in that it can make arbitrary connections between any of its ports. However, it may be more complex than a many-to-many cross-bar switch.

The above described embodiments are given as illustrative examples only. It will be readily appreciated that many deviations may be made from the specific embodiments disclosed in this specification without departing from the invention. Accordingly, the scope of the invention is to be determined by the claims below rather than being limited to the specifically described embodiments above.

What is claimed is:

1. An apparatus for providing a plurality of digital devices with a data signal received from one of a plurality of target networks, comprising:

a. a plurality of data ports, including at least one target data port, a plurality of device data ports, and a plurality of intermediate data ports;

b. means for establishing a plurality of device data paths between a plurality of digital devices and a corresponding plurality of device data ports;

c. means for establishing a target data path between one of the target networks and at least one of the target data ports;

d. means for establishing a first data path between any selected one of the plurality of target data ports and a respective first intermediate data port;

e. means for replicating a first data signal from the first intermediate data port at least to a second intermediate data port and to a third intermediate data port; and f. means for establishing a second data path between the second intermediate data port and a first selected data port of the plurality of device data ports and for establishing a third data path between the third intermediate data port and a second selected data port of the plurality of device data ports, so that data can be selectively exchanged between any one of the plurality of target networks and at least any two of the plurality of digital devices.

2. The apparatus of claim 1, further comprising additional replicating means, each capable of replicating a data signal from a selected one of a first plurality of intermediate data ports to at least two different selected ports of a second plurality of intermediate data ports.

3. The apparatus of claim 2, further comprising means for automatically controlling the first data path establishing means, the second data path establishing means and third data path establishing means.

4. The apparatus of claim 3, wherein when a digital device requests a connection to a selected target network, the controlling means comprises a program that causes the first data path establishing means to establish a first data path from the target data port receiving a data signal from the selected target to an unconnected one of the first plurality of intermediate data ports.

5. The apparatus of claim 3, wherein the automatically controlling means comprises a microprocessor.

6. The apparatus of claim 3, wherein the automatically controlling means comprises a plurality of discrete logic elements.

7. The apparatus of claim 1, further comprising additional replicating means and means for establishing a data path between a first replicating means and a second replicating means.

8. The apparatus of claim 1, wherein the first data path establishing means, the second data path establishing means, and the third data path establishing means comprise a cross-bar switch.

9. The apparatus of claim 8, wherein the cross-bar switch is a many-to-many switch.

10. The apparatus of claim 8, wherein the cross-bar switch is a square switch.

11. The apparatus of claim 8, wherein the cross-bar switch is an electronic switch.

12. The apparatus of claim 8, wherein the cross-bar switch is an optical switch.

13. An apparatus for establishing data communication paths between a plurality of target networks and a plurality of digital devices, comprising:

a. a cross-bar switch in data communication with the target networks and the digital devices;

b. a plurality of replicators in data communication with the cross-bar switch that generate, and make available to the cross-bar switch, at least two copies of a data signal received from the cross-bar switch; and c. a controller in control communication with the cross-bar switch that selectively causes the cross-bar switch to establish a first data path between at least one target network and a first replicator, and that selectively causes the cross-bar switch to establish a second data path between the first replicator and at least one digital device.

14. The apparatus of claim 13, wherein the cross-bar switch comprises a many-to-many switch.

15. The apparatus of claim 13, wherein the cross-bar switch comprises a square switch.

16. The apparatus of claim 13, wherein the controller comprises a microprocessor.

17. The apparatus of claim 13, wherein the controller comprises a plurality of discrete logic elements.

18. A series of operational steps to be performed on a computer used to control an apparatus employing at least one replicator, with each replicator having at least three ports, to provide a plurality of digital devices with a data signal received from at least one of a plurality of target networks, comprising the steps of:

a. determining that a fast digital device of the plurality of digital devices has requested the establishment of a data path between the first digital device and a selected fast target network of the plurality of target networks; and b. establishing a data path between the fast digital device and the first target network when the first digital device has requested the establishment of a data path, and when no data path has already been established between the first target network and a second digital device.

19. The series of operational steps of claim 18, further comprising the step of terminating the data path between the fast digital device and the first target network when the first digital device no longer needs to receive data from the first target network.

20. The series of operational steps of claim 18, further comprising the steps of:

a. determining that the first digital device has requested the establishment of a data path between the fast digital device and the selected fast target network of the plurality of target networks, and that a data path has already been established between the first target network and a second digital device, and that no data path has already been established between the first target network and a first replicator; and b. establishing a data path between the first target network and the fast and second digital devices.

21. The series of operational steps of claim 20, wherein the establishing step comprises the steps of:

a. finding a currently available first replicator from a plurality of replicators;

b. terminating the data path that has already been established between the first target network and the second digital device;

c. establishing a data path between the fast replicator and the fast target network;

d. establishing a data path between the first replicator and the first digital device; and e. establishing a data path between the first replicator and the second digital device.

22. The series of operational steps of claim 18, further comprising the steps of:

a. determining that the first digital device has requested the establishment of a data path between the first digital device and the selected first target network of the plurality of target networks, and that a data path has already been established between the first target network and a second digital device, and that a data path has previously been established between the first target network and a first replicator, and that the first replicator has an available first port; and b. establishing a data path between the first port and the first digital device.

23. The series of operational steps of claim 18, further comprising the steps of:

a. determining that the first digital device has requested the establishment of a data path between the first digital device and the selected first target network of the plurality of target networks, and that a data path has already been established between the first target network and a second digital device, and that a data path has previously been established between the first target network and a second replicator, and that the second replicator does not have an available port; and b. establishing data paths between the first target network and the first digital device and any digital devices in data communication with the second replicator.

24. The series of operational steps of claim 23, wherein the establishing step comprises the following steps:

a. finding a currently available third replicator having enough ports to establish data paths between the second replicator and at least the first digital device, the first target network and the digital devices in data communication with the second replicator;

b. terminating the data path between the second replicator and the first target network;

c. terminating the data paths between the second replicator and the digital devices in data communication with the second replicator;

d. establishing a data path between the first target network and the third replicator;

e. establishing a data path between the third replicator and the first digital device; and f. establishing a data path between the third replicator and the digital devices previously in data communication with the second replicator.

25. A method of providing a plurality of digital devices with a data signal received from one of a plurality of target networks, comprising the steps of:

a. establishing a data path between a target network and a target data port;

b. establishing a data path between a plurality of digital devices and a plurality of device data ports;

c. establishing a first data path between any selected one of a plurality of target data ports and a first intermediate data port;

d. replicating a first data signal from the first intermediate data port to at least a second intermediate data port and a third intermediate data port;

e. establishing a second data path between the second intermediate data port and a first selected device data port of a plurality of device data ports; and f. establishing a third data path between the third intermediate data port and a second selected device data port of the plurality of device data ports.

* * * * *